United States Patent
Yeom

(10) Patent No.: US 7,519,732 B2
(45) Date of Patent: Apr. 14, 2009

(54) ROUTING SERVICE METHOD IN VOICE OVER INTERNET PROTOCOL SYSTEM

(75) Inventor: Eung-Moon Yeom, Suwon-shi (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 580 days.

(21) Appl. No.: 10/134,606

(22) Filed: Apr. 30, 2002

(65) Prior Publication Data

US 2002/0188755 A1 Dec. 12, 2002

(30) Foreign Application Priority Data

May 26, 2001 (KR) .............................. 2001-29285

(51) Int. Cl.
*G06F 15/173* (2006.01)
*G06F 15/16* (2006.01)
*H04L 12/66* (2006.01)

(52) U.S. Cl. ................. 709/238; 709/227; 709/249; 370/352; 379/900

(58) Field of Classification Search ............. 709/227, 709/238, 249; 370/352, 356; 379/900
See application file for complete search history.

(56) References Cited

U.S. PATENT DOCUMENTS

| | | | |
|---|---|---|---|
| 6,584,094 B2 * | 6/2003 | Maroulis et al. ............ | 370/352 |
| 6,760,324 B1 * | 7/2004 | Scott et al. ................. | 370/352 |
| 6,771,637 B1 * | 8/2004 | Suzuki et al. .............. | 370/352 |
| 6,798,772 B2 * | 9/2004 | Bergman et al. ........... | 370/354 |
| 6,934,258 B1 * | 8/2005 | Smith et al. ................ | 370/238 |
| 6,961,346 B1 * | 11/2005 | Michalewicz et al. ...... | 370/465 |
| 6,973,091 B1 * | 12/2005 | Hester ........................ | 370/401 |
| 7,120,682 B1 * | 10/2006 | Salama ....................... | 709/222 |
| 7,180,890 B2 * | 2/2007 | Bushnell et al. ............ | 370/352 |
| 7,212,516 B1 * | 5/2007 | O'Sullivan et al. ......... | 370/352 |
| 7,457,279 B1 * | 11/2008 | Scott et al. ................. | 370/352 |
| 2002/0110112 A1 * | 8/2002 | Tuomi ........................ | 370/352 |

(Continued)

FOREIGN PATENT DOCUMENTS

WO     WO 99/05590 A2     2/1999

(Continued)

OTHER PUBLICATIONS

Chinese Office Action in applicant's corresponding Chinese Patent Application No. 02126290.X, issued May 13, 2005. (English Translation of Chinese Office Action is attached).

*Primary Examiner*—Douglas B Blair
(74) *Attorney, Agent, or Firm*—Robert E. Bushnell, Esq.

(57) ABSTRACT

A routing service method in a public switched telephone network (PSTN) system uses a stand-alone gateway interworking with disparate central office lines. The stand-alone gateway checks whether a call service can be provided over the Internet with reference to an internal database having periodically updated call service state information in response to a call service request from a calling private branch exchange (PBX) connected to the stand-alone gateway via a central office line. If the call service cannot be provided over the Internet, the stand-alone gateway transmits a call service request, together with a public switched telephone network (PSTN) rerouting control request, to the calling PBX. The calling PBX transfers the call to a called party over the PSTN in response to the PSTN rerouting control request.

25 Claims, 11 Drawing Sheets

U.S. PATENT DOCUMENTS

2008/0013531 A1* 1/2008 Elliott et al. ............. 370/356
2008/0025295 A1* 1/2008 Elliott et al. ............. 370/356

FOREIGN PATENT DOCUMENTS

| WO | WO 0007403 A1 | 2/2000 |
| WO | WO 01/06740 A2 | 1/2001 |
| WO | WO 0106740 A2 | 1/2001 |

* cited by examiner

<T1/E1 – T1/E1 INTERFACE>

<FXO - FXS INTERFACE>

ROUTING SERVICE METHOD IN VOICE OVER INTERNET PROTOCOL SYSTEM

CLAIM OF PRIORITY

This application makes reference to, incorporates the same herein, and claims all benefits accruing under 35 U.S.C. §119 from my application ROUTING SERVICE METHOD IN VOICE OVER INTERNET PROTOCOL SYSTEM filed with the Korean Industrial Property Office on 26 May 2001 and there duly assigned Serial No. 29285/2001.

BACKGROUND OF THE INVENTION

1. Technical Field

The present invention relates generally to a voice over Internet protocol (VoIP) system and, in particular, to a routing service method in a VoIP system using a stand-alone gateway.

2. Related Art

VoIP is a novel communication service that delivers voice information over the Internet rather than over the public switched telephone network (PSTN). A major advantage of VoIP telephony is that it avoids the tolls charged by ordinary telephone service, including domestic/international calls, because VoIP is implemented in a packet-based network. VoIP sends video information, as well as audio information, using International Telecommunications Union-Telecommunications standardization sector (ITU-T) H.323.

A VoIP system includes the Internet. The Internet is connected to gateways and personal computers (PCs). The gateways are connected to respective PSTNs that are in turn connected to telephones. The telephones and the PCs are endpoints that can communicate in voice (mandatory), with pictures (optional), and with data (optional) in one-to-one conversations or conferences. These terminals can carry out real-time bi-directional communications with the gateways or other terminals. The gateways enable terminals (e.g., the PCs) connected to the Internet, which is a packet-based network, or terminals (e.g., the telephones) connected to the PSTNs or to the integrated services digital network (ISDN), to make real-time bi-directional communications. For example, the gateways send voice and fax data received from the PSTNs to the Internet after real-time compression and protocol conversion.

Such gateways are usually categorized into three types according to installation and usage: a built-in type that is inserted in the form of a card in a key telephone system (KTS) or a private branch exchange (PBX); a server type installed in a platform like window network terminal (NT); and a stand-alone type independent of other terminals. Stand-alone gateways are divided into trunk and ear and mouth (TANDEM) types and stand-alone types according to their functionalities. A stand-alone gateway with the TANDEM functionality supports interworking between disparate central office (CO) lines. The TANDEM stand-alone gateway is connected to a PBX and/or a KTS via an internal T1/E1 interface, a loop start trunk interface, and a subscriber line circuit (SLC) interface. A stand-alone gateway with the stand-alone functionality is connected directly to a plurality of telephones.

As to a routing service, when attempting a VoIP call in a VoIP system using stand-alone gateways upon origination of a VoIP call from a caller, the VoIP call is transferred to a local stand-alone gateway via a calling PBX. The local stand-alone gateway routes the VoIP call to a called party via a route which is chosen as the best one. The route runs from the caller to the called party through the calling PBX, the local stand-alone gateway, the Internet, a remote stand-alone gateway, and a called PBX.

If the local stand-alone gateway senses that the route is not available for the call service due to, for example, link-down of the remote stand-alone gateway, it chooses the second best route. The route runs from the caller to the called party through the calling PBX, the local stand-alone gateway, a PSTN central office (CO) line, a PSTN, a PSTN, and the called PBX. If the best route is not available, the local stand-alone gateway takes a roundabout route through the PSTNs in order to route the call to the called party. In order to take the roundabout route via the CO line, the local stand-alone gateway and the remote stand-alone gateway should have CO line interfaces.

To offer such a roundabout route call service over a legacy network, the CO line should be prepared just in case. Preservation of the CO line for access to a legacy network, such as the PSTN, is a redundancy from the VoIP system's perspective. As a result, the line interfaces of the stand-alone VoIP system are or become less flexible.

SUMMARY OF THE INVENTION

It is, therefore, an object of the present invention to provide an improved roundabout routing service method in a VoIP system using a stand-alone gateway.

It is another object of the present invention to provide a routing service method in which a roundabout route is taken over the PSTN in routing an outgoing VoIP call in a VoIP system using a stand-alone gateway.

The foregoing and other objects of the present invention are achieved by a routing service method in a voice over internet protocol (VoIP) system using a stand-alone gateway interworking with disparate CO lines. The stand-alone gateway checks whether call service can be provided over the Internet, referring to an internal database having periodically updated call service state information, in response to a call service request from a calling private branch exchange (PBX) connected to the stand-alone gateway via a CO line. If the call service cannot be provided over the Internet, the stand-alone gateway transmits a call service request, together with a public switched telephone network (PSTN) rerouting control request, to the calling PBX. The calling PBX transfers the call to a called party over the PSTN in response to the PSTN rerouting control request.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings, in which like reference numerals indicate the same or similar components, and wherein:

FIG. 7 illustrates a remote gateway access code table database according to the embodiment of the present invention;

FIG. 8 illustrates a remote gateway IP table database according to the embodiment of the present invention; and FIG. 9 illustrates a remote gateway state table database according to the embodiment of the present invention.

DETAILED DESCRIPTION OF THE PREFERRED EMBODIMENT

A preferred embodiment of the present invention will be described hereinbelow with reference to the accompanying drawings. In the following description, well-known functions or constructions are not described in detail since they would obscure the invention in unnecessary detail.

Figure 1:
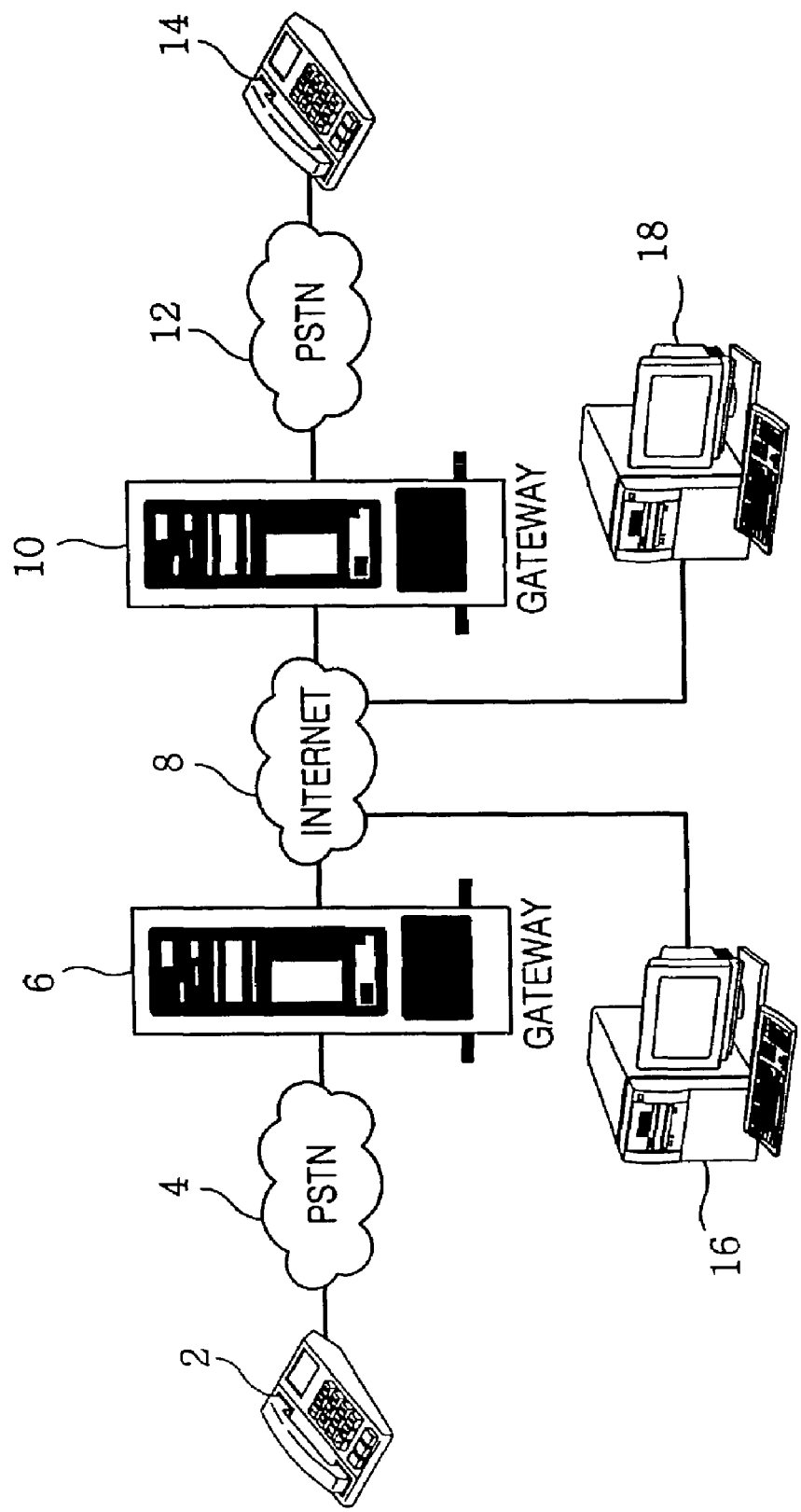
FIG. 1 is a schematic view of a VoIP system.

FIG. 1 is a schematic view of a VoIP system which uses the Internet as a backbone. Referring to FIG. 1, the VoIP system includes the Internet 8. The Internet 8 is connected to gateways 6 and 10 and to personal computers (PCs) 16 and 18. The gateways 6 and 10 are connected to PSTNs 4 and 12, respectively, which are in turn connected to telephones 2 and 14, respectively. The telephones 2 and 14 and the PCs 16 and 18 are endpoints that can communicate in voice (mandatory), with pictures (optional), and with data (optional) in one-to-one conversations or conferences. These terminals can carry out real-time bi-directional communications with the gateways 6 and 10 or other terminals. The gateways 6 and 10 enable terminals (e.g., the PCs 16 and 18) connected to the Internet 8, which is a packet-based network, or terminals (e.g., the telephones 2 and 14) connected to the PSTNs 4 and 12 or the integrated services digital network (ISDN), to make real-time bi-directional communications. For example, the gateways 6 and 10 send voice and fax data received from the PSTNs 4 and 12, respectively, to the Internet 8 after real-time compression and protocol conversion.

Gateways, such as the gateway 6 shown in FIG. 1, are usually categorized into three types according to installation and usage: a built-in type that is inserted in the form of a card in a key telephone system (KTS) or a private branch exchange (PBX); a server type installed in a platform like window network terminal (NT); and a stand-alone type independent of other terminals. Stand-alone gateways are divided again into trunk and ear and mouth (TANDEM) types and stand-alone types according to their functionalities. A stand-alone gateway with the TANDEM functionality supports interworking between disparate central office (CO) lines. The TANDEM stand-alone gateway is connected to a PBX and/or a KTS via an internal T1/E1 interface, a loop start trunk interface, and a subscriber line circuit (SLC) interface. A stand-alone gateway with the stand-alone functionality is connected directly to a plurality of telephones.

A routing service during an attempt to make a VoIP call in a VoIP system using stand-alone gateways will now be described with reference to FIG. 2.

Figure 2:
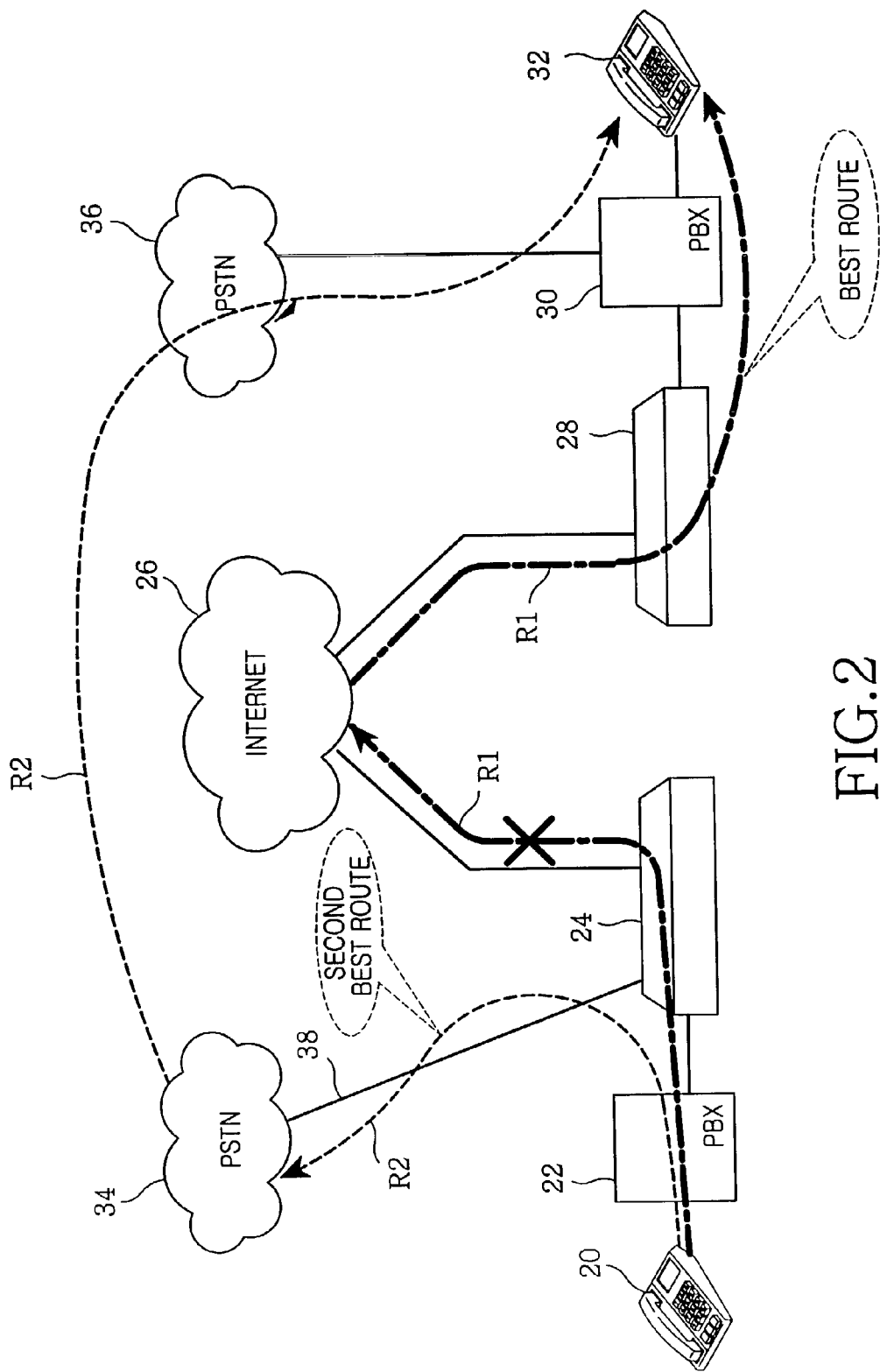
FIG. 2 illustrates routing in a VoIP system using stand-alone gateways.

FIG. 2 illustrates the routing in a VoIP system using stand-alone gateways. Referring to FIG. 2, upon origination of a VoIP call from a caller 20, the VoIP call is transferred to a local stand-alone gateway 24 via a calling PBX 22. The local stand-alone gateway 24 routes the VoIP call to a called party 32 via a routing route R1 which is chosen as the best one. The route R1 runs from the caller 20 to the called party 32 through the calling PBX 22, the local stand-alone gateway 24, the Internet 26, a remote stand-alone gateway 28, and a called PBX 30.

If the local stand-alone gateway 24 senses that the route R1 is not available for the call service due to, for example, link-down of the remote stand-alone gateway 28, it chooses the second best route R2. The route R2 runs from the caller 20 to the called party 32 through the calling PBX 22, the local stand-alone gateway 24, a PSTN central office (CO) line 38, a PSTN 34, a PSTN 36, and the called PBX 30. If the best route R1 is not available, the local stand-alone gateway 24 takes a roundabout route through the PSTNs 34 and 36 so as to route the call to the called party 32. In order to take the roundabout route via the CO line 38, the local stand-alone gateway 24 and the remote stand-alone gateway 28 should have CO line interfaces.

To offer such a roundabout route call service over a legacy network (PSTN 34 in FIG. 2), the CO line 38 should be prepared just in case. Preservation of the CO line 38 for access to a legacy network, such as the PSTN 34, is a redundancy from the VoIP system's perspective. As a result, the line interfaces of the stand-alone VoIP system are or become less flexible.

Figure 3:
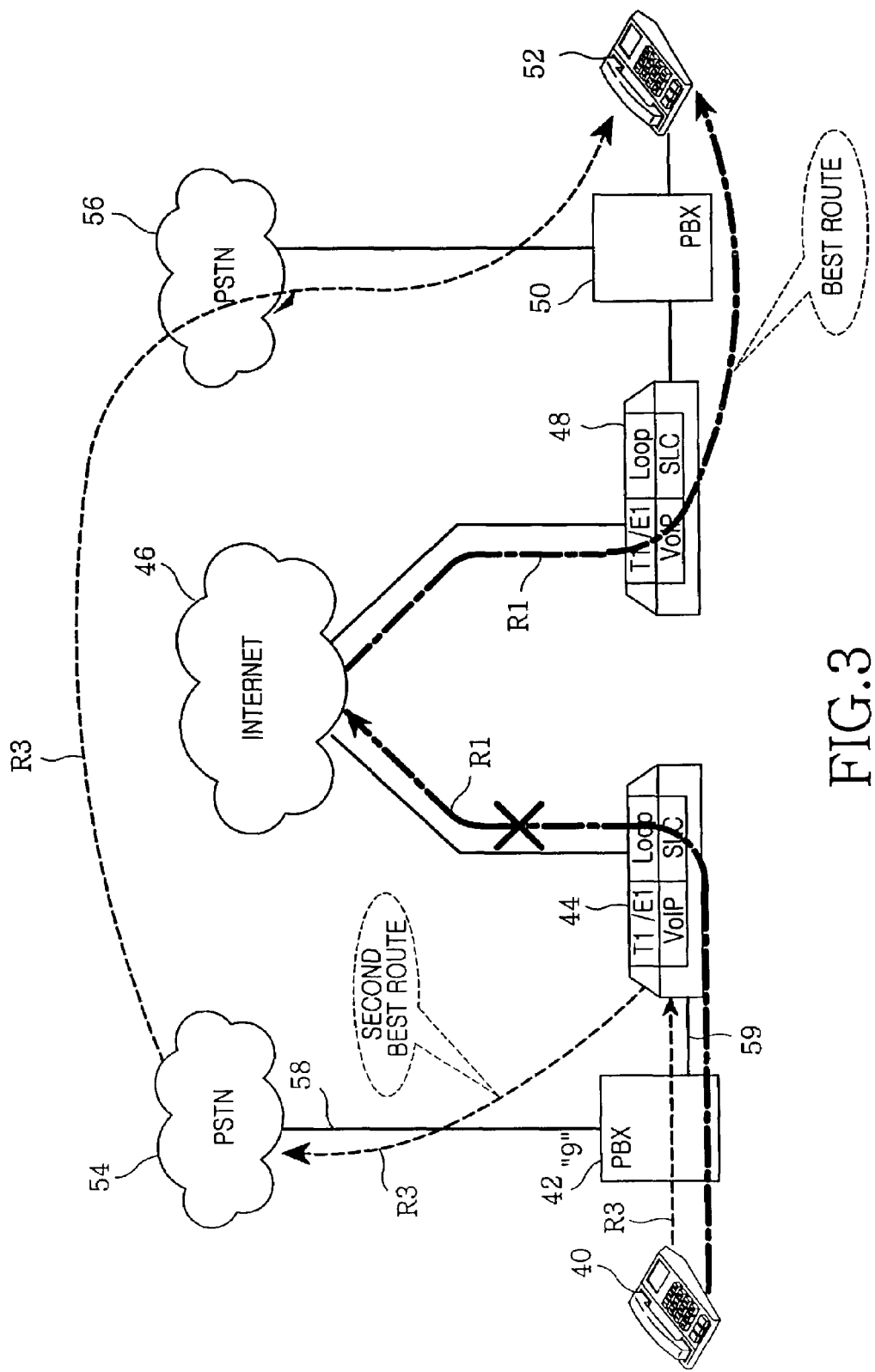
FIG. 3 illustrates routing in a VoIP system using stand-alone gateways according to an embodiment of the present invention.

FIG. 3 illustrates routing in a VoIP system using stand-alone gateways according to an embodiment of the present invention. Referring to FIG. 3, if call service over the Internet is not available, a VoIP call is routed via a roundabout route R3 involving a CO line 59, used for an incoming call between a calling PBX 42 and a local stand-alone gateway 44, and an existing CO line 58 between the calling PBX 42 and a PSTN 54, as compared to the routing method that uses the roundabout route R2 involving the CO line 38 between the PSTN 34 and the stand-alone gateway 24. In other words, the stand-alone gateway 44 uses an incoming trunk also as a roundabout-route outgoing trunk.

Figure 4:
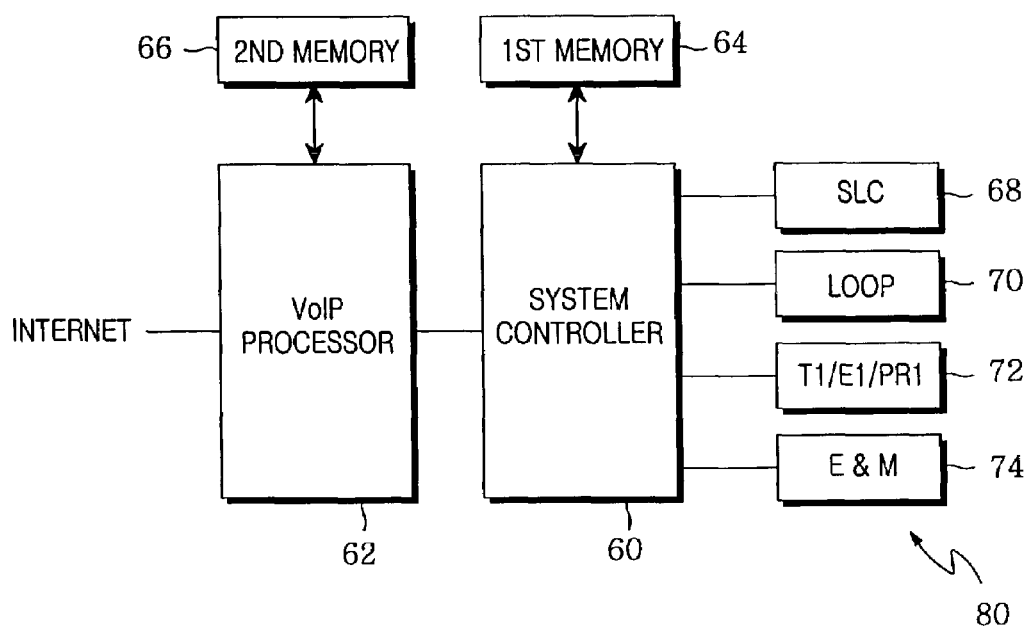
FIG. 4 is a block diagram of a stand-alone gateway according to the embodiment of the present invention.

FIG. 4 is a block diagram of stand-alone gateways 44 and 48 according to the embodiment of the present invention. Referring to FIG. 4, each of the stand-alone gateways 44 and 48 comprises a system controller 60, a VoIP processor 62, a first memory 64 controlled by the system controller 60, and a second memory 66 controlled by the VoIP processor 62.

The system controller 60 provides overall control of the system. Specifically, the system controller 60 controls the operation of each board, senses and generates dual tone multi-frequency (DTMF) signals, supports a variety of dial tones, provides 256'256 channel time slots and conference call service, and supports E1/T1 primary rate interface (PRI) digital line interfacing and R2 signaling. The first memory 64 includes a first flash memory for booting, a second flash memory for storing a program database used in the system, and a random access memory (RAM) for implementing system software. The VoIP processor 62 converts voice data for the PSTN 54 or 56 (FIG. 3) to data for the Internet 46, and supports the H.323 V3 protocol. The second memory 66 has a database for VoIP processing. The database includes an access code table, an IP table, and a state table for a remote gateway. A "rerouting insert digit" field for setting PSTN rerouting is also provided in the database.

An interface unit 80 has an SLC interface 68, a loop start trunk interface 70, a T1/E1/PRI interface 72, and an ear and mouth tie trunk (E&M) interface 74 in the form of cards. The SLC interface 68 provides an interface between a standard analog telephone and a gateway. The loop interface 70 offers a CO line interface for an exchange. The T1/E1/PRI interface 72 connects a high-speed digital line T1 or E1, or an ISDN PRI line, to a gateway. The E&M interface 74 is used to link the gateway to a PBX or a KTS by means of a four-wire dedicated line.

Figure 5A:
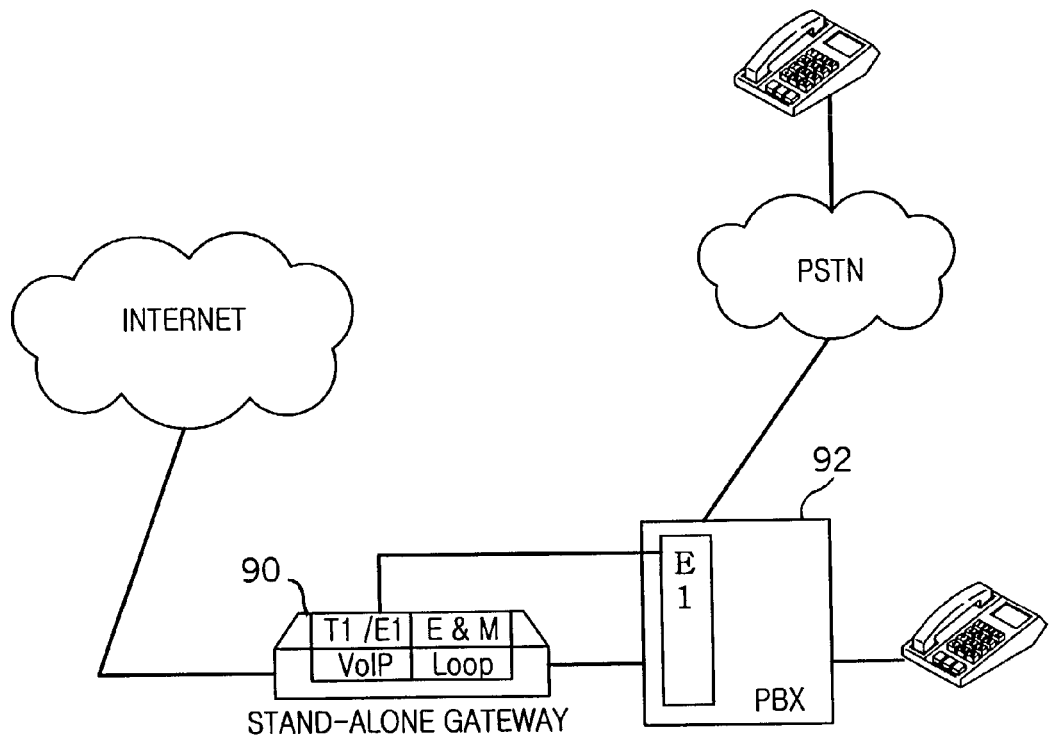
FIGS. 5A, 5B and 5C illustrate interface configurations between the stand-alone gateway and a PBX or a KTS according to the embodiment of the present invention.
Figure 5B:
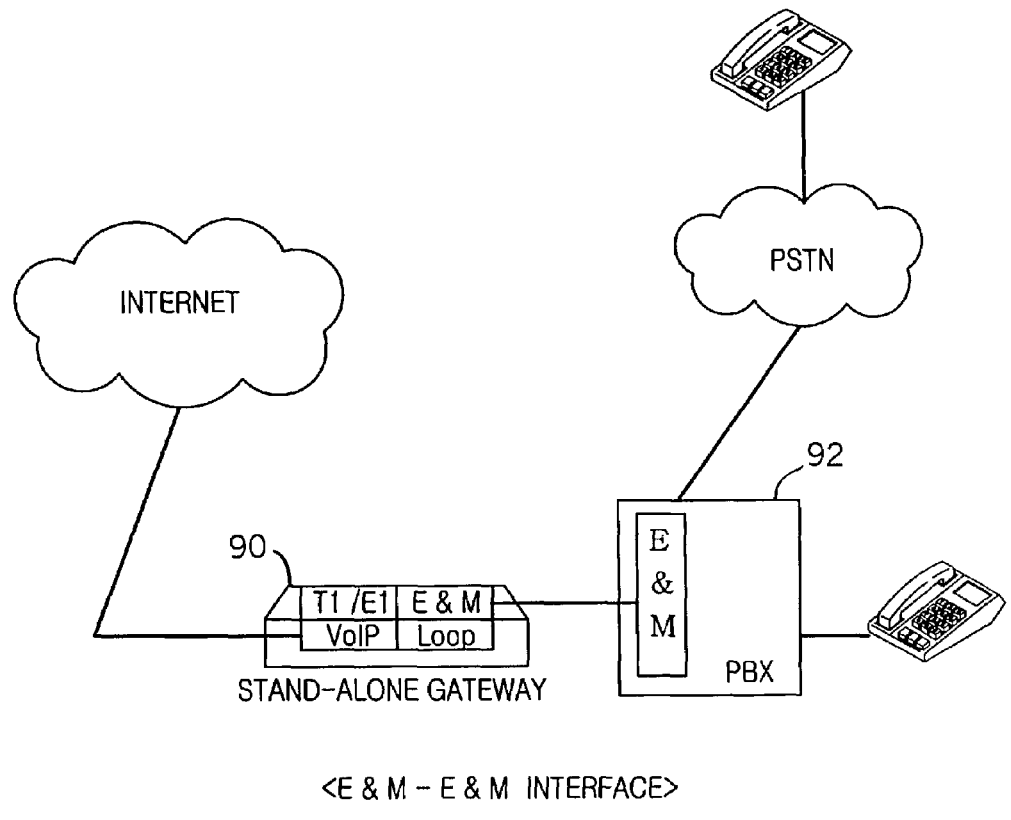
Figure 5C:
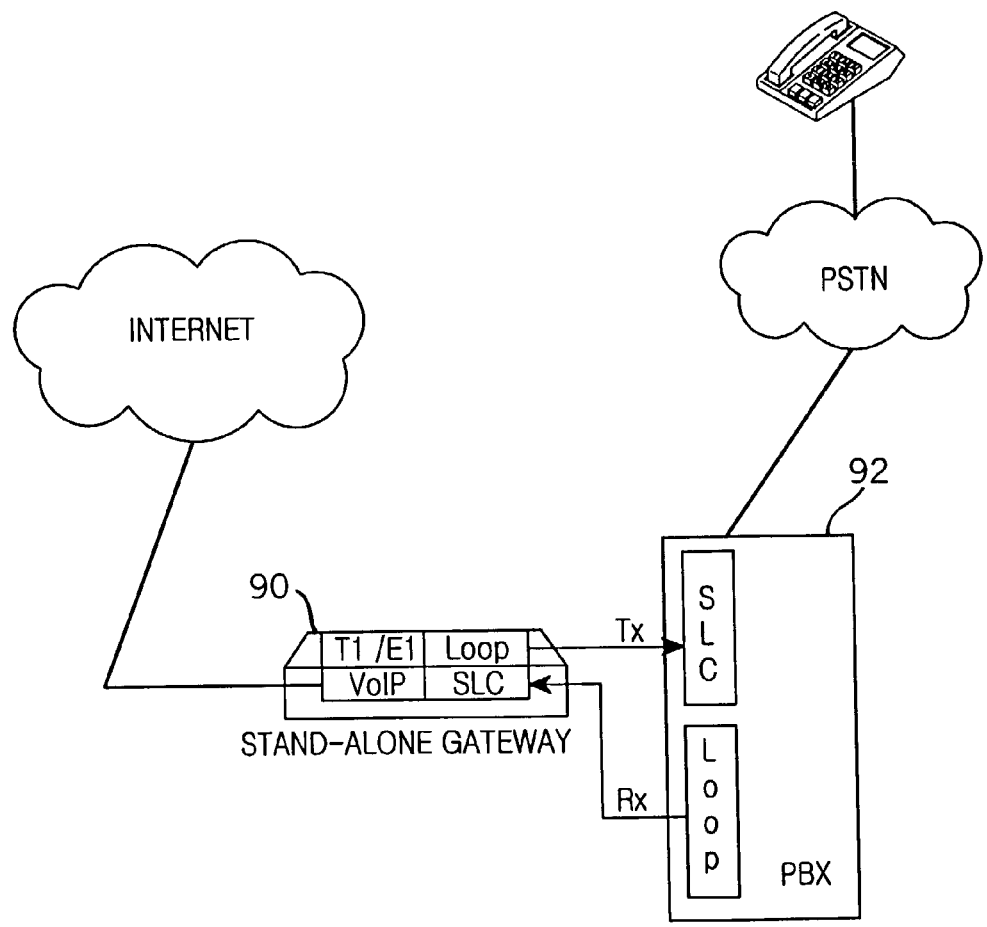

FIGS. 5A, 5B and 5C illustrate interface configurations between a stand-alone gateway and a PBX or KTS according to the embodiment of the present invention. The stand-alone gateway 90 is linked to the PBX (or KTS) 92 by a T1/E1-T1/E1 interface in FIG. 5A, an E&M-E&M interface in FIG. 5B, and a foreign exchange office-foreign exchange station (FXO-FXS) interface in FIG. 5C. In the FXO-FXS interface of FIG. 5C, loop®SLC interfacing is implemented separately for transmission (Tx) and reception (Rx).

In accordance with the embodiment of the present invention, the VoIP system includes the PBXs 42 and 50 (FIG. 3) that can access PSTNs 54 and 56, respectively, and the stand-alone gateways 44 and 48, respectively, for VoIP processing. The interface between the stand-alone gateways 44 and 48 and the PBXs 42 and 50 can be T1/E1-T1/E1, E&M-E&M, or FXO-FXS as shown in FIGS. 5A, 5B and 5C, respectively.

Figure 6:
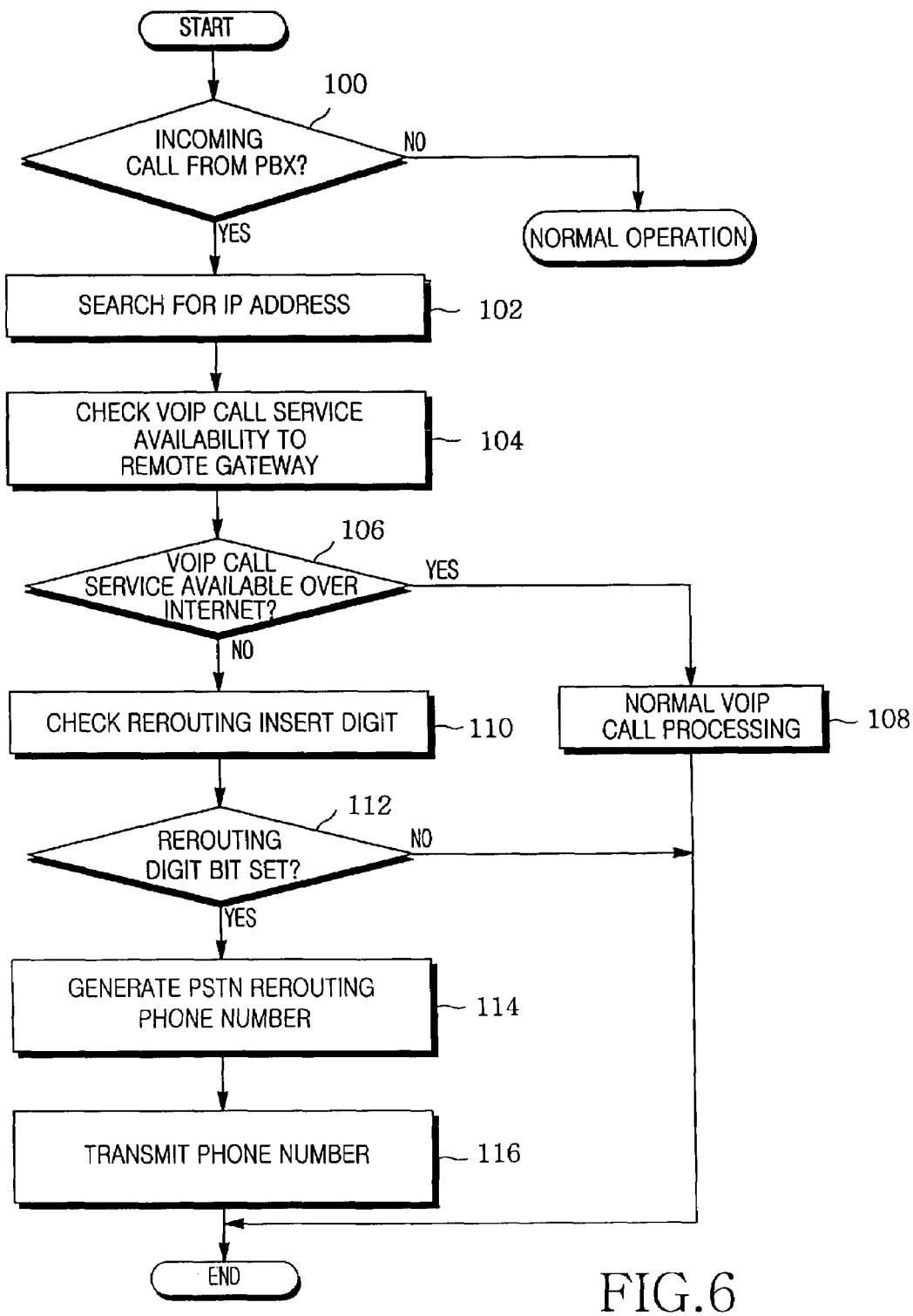
FIG. 6 is a flowchart illustrating a routing operation in the stand-alone gateway according to the embodiment of the present invention.

FIG. 6 is a flowchart illustrating a roundabout routing operation in the local stand-alone gateway 44 of FIG. 3. In the roundabout routing operation, the CO line 59 intended for an incoming call between the calling PBX 42 and the local stand-alone gateway 44 is also used for a roundabout outgoing call. That is, the local stand-alone gateway 44 uses the incoming trunk also as the roundabout-route outgoing trunk.

Referring to FIGS. 3 thru 6, upon origination of a VoIP call from a caller 40, the VoIP call is transferred to the local stand-alone gateway 44 through the calling PBX 42 and the CO line 59. In the local stand-alone gateway 44, the system controller 60 receives the VoIP call via the interface unit 80 configured as shown in FIGS. 5A, 5B or 5C, and provides an access code for VoIP call access (for example, '800') to the VoIP processor 62. Upon receipt of the access code '800', the VoIP processor 62 recognizes the incoming call from the calling PBX 42 in step 100 of FIG. 6. In step 102, the VoIP processor 62 obtains the IP address of the remote stand-alone gateway 48 from a remote gateway access code table in the second memory 66 using a destination phone number contained in the incoming call that is obtained by accessing a VoIP port. That is, the local stand-alone gateway 44 receives the phone number entered by the caller 40 in the E.164 format, and searches the remote gateway access code table for the IP address of the remote stand-alone gateway 48 corresponding to the phone number of the E.164 format.

Figure 7:
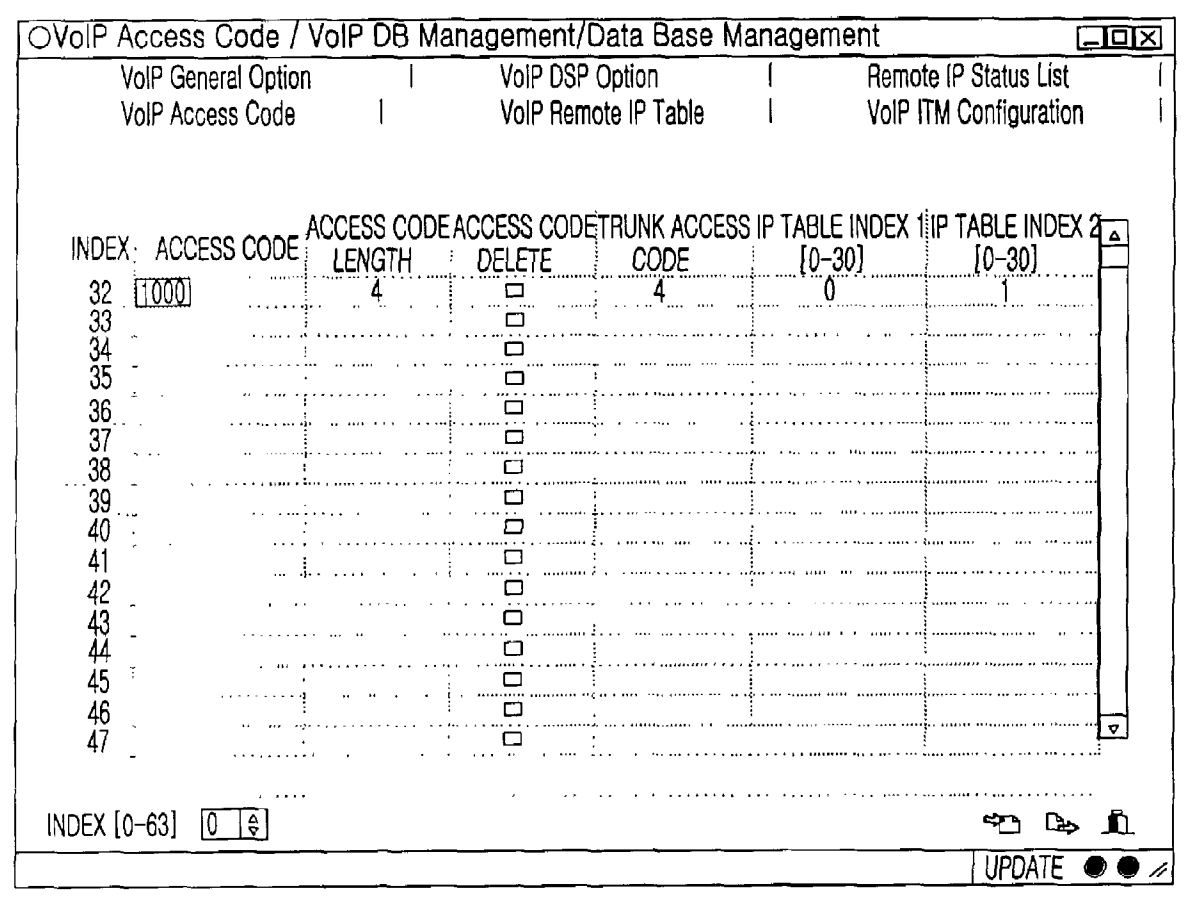
Figure 8:
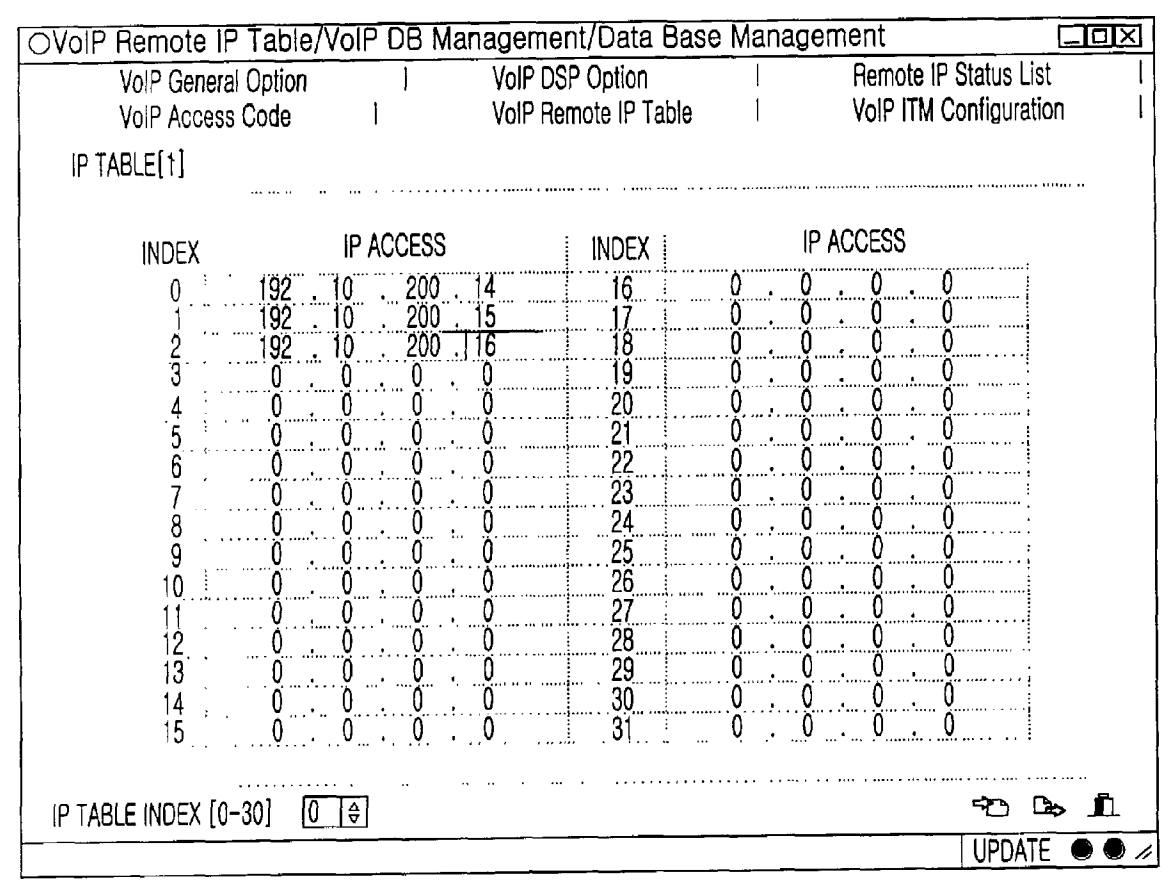
Figure 9:
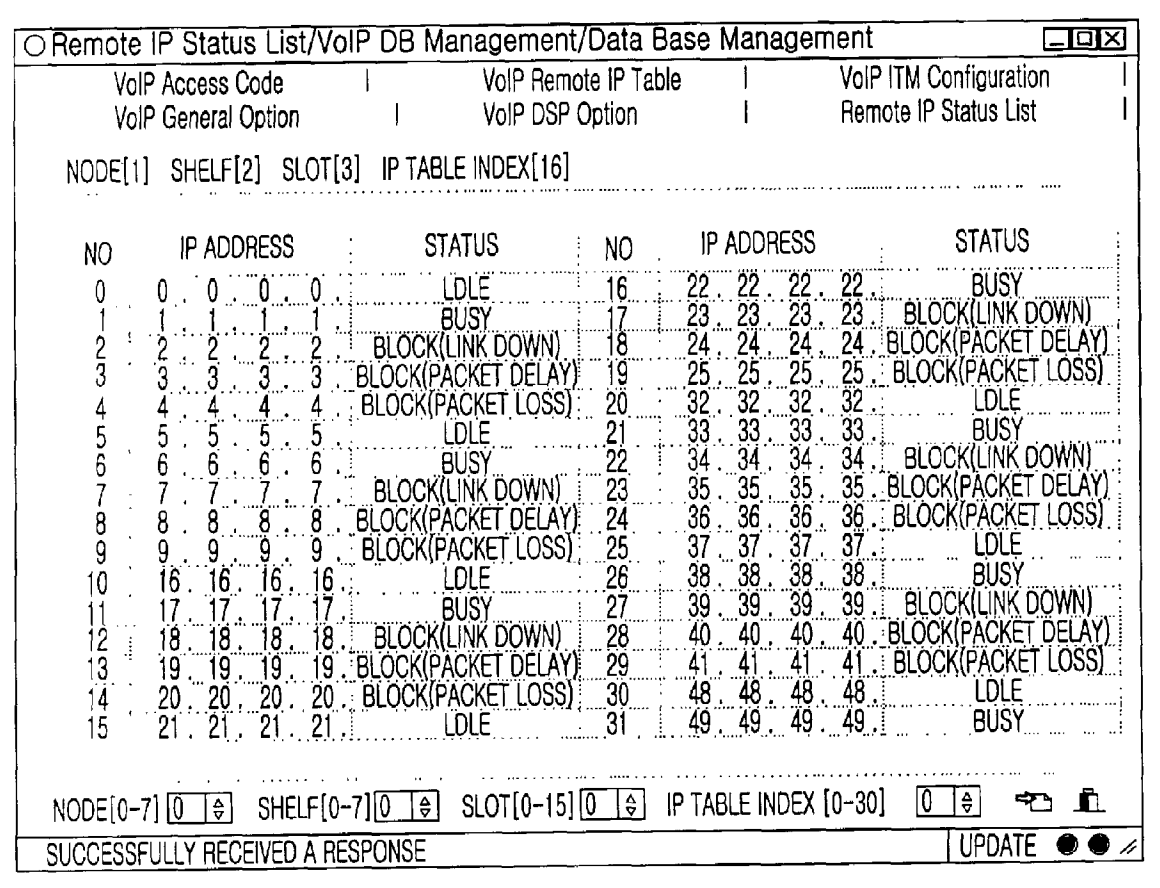

The IP address search will be described in more detail referring to FIGS. 7 thru 9. FIG. 7 illustrates an example of a remote gateway access code table database according to the embodiment of the present invention, and FIG. 8 illustrates an example of a remote gateway IP table database, while FIG. 9 illustrates a remote gateway state table database according to the embodiment of the present invention.

Referring to FIG. 7, the remote gateway access code table shown in FIG. 7 is a database from which an IP address is obtained using a phone number entered by a caller using an Internet phone. In FIG. 7, Access Code can be replaced with a D.D.D. number, Access Length represents D.D.D. length, and Trunk Access Code represents the trunk access code of a remote gateway. IP_Table Index indicates an IP address group, which can be set by region (D.D.D.). Table 1 below shows an example of an access code table.

TABLE 1

| index | Access code | Access length | Access code Del | Trunk Access code | IP index1 | IP index2 |
|---|---|---|---|---|---|---|
| 1 | 031 | 4 | Yes | 8 | 0 | 1 |
| ... | | | | | | |

If a user enters a phone number "031-200-3000" in Seoul, a VoIP gateway obtains the IP address of an idle remote gateway from IP index 1, 2 in correspondence with "031". An actual number that the VoIP gateway transmits to the remote gateway is "8-200-3000", which is produced by deleting "031" referring to Access code Del=Yes and, instead, inserting "8" of Trunk Access code. The remote gateway IP table shown in FIG. 8 lists the IP addresses of operating gateways for corresponding regions according to IP indexes of the access code table shown in FIG. 7.

Returning to FIG. 6, when the VoIP processor 62 searches for an IP address in the remote gateway access code table, it determines whether the VoIP call is serviceable over the Internet 46 in cooperation with the remote stand-alone gateway of the IP address in step 104. The determination is made with reference to the remote gateway IP table shown in FIG. 8 and the remote gateway state table shown in FIG. 9. The remote gateway state table has updated information about the channel states of remote gateways (busy, idle, and default) and the link states between the remote gateways and the local stand-alone gateway. That information is obtained by periodical link tests on the local stand-alone gateway and the remote gateways. Thus, the VoIP processor 62 can determine whether the VoIP call is serviceable with the remote gateway over the Internet 46 when the IP address is extracted from the incoming call from the calling PBX 42.

In step 106, the VoIP processor 62 determines whether the VoIP call service can be provided over the Internet 46. If the VoIP call is serviceable over the Internet 46, the VoIP call is processed in a normal way in step 108. In the normal VoIP call processing, the local stand-alone gateway 44 routes the VoIP call to the called party 52 via the best route R1 running from the local stand-alone gateway 44 to the called PBX 50 through the Internet 46 and the remote stand-alone gateway 48.

On the other hand, if the VoIP call service over the Internet 46 is impossible due to, for example, the link-down of the remote stand-alone gateway, channel busy, traffic congestion, packet loss, packet delay, etc., the VoIP processor 62 takes a roundabout route passing through PSTNs in steps 110 to 116.

The VoIP processor 62 accesses the VoIP database of the second memory 66 in step 110, and checks whether a PSTN CO line access code value is set in the rerouting insert digit field in step 112. If it is set, the VoIP processor 62 generates a phone number for rerouting the VoIP call to the PSTN 54 by inserting a PSTN CO line access code ("9" in FIG. 3) before a destination phone number in step 114. In step 116, the VoIP processor 62 transfers a call corresponding to the phone number for rerouting to the PSTN 54 to the calling PBX 42 under the control of the system controller 60. At the same time, the local stand-alone gateway 44 controls the CO line 59 for an incoming call between the calling PBX 42 and the local stand-alone gateway 44 to be used for a roundabout outgoing call. That is, the local stand-alone gateway 44 uses the incoming trunk also as the roundabout outgoing trunk.

Meanwhile, the calling PBX 42 processes the call received via the CO line 59 as a new incoming call from the local stand-alone gateway 44. More specifically, the calling PBX 42 recognizes, from the PSTN CO line access code inserted before the phone number, that the call is destined for the PSTN 54, deletes the PSTN CO line access code (for example, "9"), and then transmits the destination phone number to the PSTN 54.

As described above, when taking a roundabout route for the VoIP call, the local stand-alone gateway 44 generates the PSTN access code for the calling PBX (or KTS) and inserts it before the destination phone number, so that the called PBX (or KTS) 42 can process the roundabout call without separate phone number processing for a TANDEM. A single PSTN access code can be fixed, for example, "9".

In the VoIP system of the present invention, if a VoIP call is not serviceable over the Internet 46, the VoIP call service is implemented via the second best routing route R3. The routing route R3 runs from the caller 40 to the called party 52 through the calling PBX 42, the local stand-alone gateway 44, the calling PBX 44, the PSTN 54, the PSTN 56, and the called PBX 50.

In accordance with the present invention, when it is necessary to take a roundabout route for a VoIP call service due to link-down, channel busy, packet loss, and packet delay between a local stand-alone gateway and a remote stand-alone gateway, the VoIP call can be routed to a called party via the roundabout route over the PSTN using an existing interface between a calling PBX and the local stand-alone gateway without the need for procuring a separate CO line interface for the PSTN.

Although a preferred embodiment of the present invention has been described, it will be understood by those skilled in the art that the present invention should not be limited to the described preferred embodiment. Rather, various changes and modifications can be made within the spirit and scope of the present invention, as defined by the following claims.

What is claimed is:

1. A routing service method in a Voice over Internet Protocol (VoIP) system using a stand-alone gateway interworking with a Public Switch Telephone Network (PSTN), comprising the steps of:
   receiving a call service request over an incoming trunk from a calling private branch exchange (PBX) connected via the PSTN;
   determining in the stand-alone gateway whether a call service can be provided over an Internet using an internal database in response to the call service request from the calling PBX; and
   using a PSTN access code for rerouting a call in response to a service request and transmitting the call to the calling PBX via a roundabout outgoing trunk used with the incoming trunk in the stand-alone gateway when it is determined that the call service cannot be provided over the Internet.

2. The routing service method of claim 1, further comprising the step of providing a central office line interface between the stand-alone gateway and the calling PBX, said central office line interface being one of a T1/E1- T1/E1 interface, an ear and mouth tie trunk-ear and mouth tie trunk (E&M-E&M) interface, and a foreign exchange office- foreign exchange station (FXO-FXS) interface.

3. The routing service method of claim 1, further comprising the steps of:
   searching for an IP address of a remote gateway using a destination phone number included in the call service request; and
   checking whether the call service can be provided over the Internet.

4. The routing service method of claim 3, wherein said searching step comprises using a remote gateway IP table to obtain the IP address of the remote gateway.

5. The routing service method of claim 3, wherein said checking step comprises using a remote gateway access code table to determine availability of service to the remote gateway.

6. The routing service method of claim 3, wherein said checking step comprises using a remote gateway state table to determine availability of service to the remote gateway.

7. The routing service method of claim 1, further comprising the step of providing a VoIP database, and wherein said transmitting of the call to the calling PBX includes checking the VoIP database.

8. The routing service method of claim 7, wherein said transmitting of the call to the calling PBX includes determining whether a PSTN central office line access code is set in a rerouting insert digit field.

9. The routing service method of claim 8, wherein said transmitting of the call to the calling PBX includes inserting the PSTN central office line access code before a destination phone number.

10. The routing service method of claim 7, wherein said transmitting of the call to the calling PBX includes inserting a PSTN central office line access code before a destination phone number.

11. The routing service method of claim 1, wherein said transmitting of the call to the calling PBX includes inserting a PSTN central office line access code before the destination phone number.

12. The routing service method of claim 1, wherein said transmitting of the call to the calling PBX includes determining whether a PSTN central office line access code is set in a rerouting insert digit field.

13. A routing service method in a Voice over Internet Protocol (VoIP) system with reference to a stand-alone gateway interworking with a Public Switched Telephone Network (PSTN), comprising the steps of:
   receiving a call service request over an incoming trunk from a calling private branch exchange (PBX) connected via the PSTN;
   accessing a database including a remote gateway Internet Protocol (IP) table, a remote gateway access code table and a remote gateway state table in a stand-alone gateway in response to the call service request from the calling PBX;
   determining in the stand-alone gateway whether a call service can be provided over an Internet by using the remote gateway state table of the database in response to the call service request from the calling PBX; and
   using a PSTN access code for rerouting a call in response to the call service request, and transmitting the call to the calling PBX via a roundabout outgoing trunk used with an incoming trunk in the stand-alone gateway when it is determined that the call service cannot be provided over the Internet.

14. A routing service method in a Voice over Internet Protocol (VoIP) system using stand-alone gateways interworking with disparate central office lines, comprising the steps of:
   providing a database, which includes an access code table, an Internet protocol (IP) table, and a state table for remote gateways, and a Public Switched Telephone Network (PSTN) rerouting setting field, to a local-stand alone gateway;
   updating the state table for remote gateways by periodically testing links between the local stand-alone gateway and remote stand-alone gateways;
   determining whether a call service over an Internet is available with reference to the state table for remote gateways by means of the local stand-alone gateway upon receipt of a call service request from a calling PBX connected to the local stand-alone gateway via a central office line;
   inserting a PSTN central office line access code set in the PSTN rerouting setting field in the call service request, and transmitting the call service request with the PSTN central office line access code to the calling PBX, when the call service over the Internet is not available; and requesting call service to the PSTN using the PSTN central office line access code by means of the calling PBX.

15. A Voice over Internet Protocol (VoIP) system for providing a routing service, comprising:
   a stand-alone gateway interworking with disparate central office lines;
   determining means in the stand-alone gateway for determining whether a call service can be provided over an Internet by accessing a database of a remote gateway in the stand-alone gateway in response to a call service request from a calling private branch exchange (PBX);
   means for using a Public Switched Telephone Network (PSTN) access code for rerouting a call in response to the call service request; and
   transmitting means in the stand-alone gateway for transmitting the call to the calling PBX via an incoming trunk used for the call service request in an internal database when it is determined that the call service cannot be provided over the Internet.

16. The system of claim 15, further comprising a central office line interface between the stand-alone gateway and the calling PBX.

17. The system of claim 16, wherein the central office line interface comprises one of a T1/E 1- T1/E1 interface, an ear and mouth tie trunk-ear and mouth tie trunk (E&M-E&M) interface, and a foreign exchange office- foreign exchange station (FXO-FXS) interface.

18. The system of claim 15, wherein said determining means performs the operations of:
   receiving the call service request from the calling PBX;
   searching for an Internet protocol (IP) address of a remote gateway using a destination phone number contained in the call service request; and
   checking whether the call service can be provided over the Internet by determining availability of service to the remote gateway.

19. The system of claim 18, wherein the searching operation comprises using a remote gateway IP table to obtain the IP address of the remote gateway.

20. The system of claim 18, wherein the checking operation comprises using a remote access code table to determine the availability of service to the remote gateway.

21. The system of claim 18, wherein the checking operation comprises using a remote gateway state table to determine the availability of service to the remote gateway.

22. The system of claim 15, further comprising a VoIP database, and wherein said transmitting means checks the VoIP database.

23. The system of claim 22, wherein said transmitting means determines whether a PSTN central office line access code is set in a rerouting insert digit field.

24. The system of claim 23, wherein said transmitting means inserts a PSTN central office line access code before a destination phone number.

25. A Voice over Internet Protocol (VoIP) system which provides a routing service, said system comprising:
   stand-alone gateways interworking with disparate central office lines;
   a database which includes an access code table, an Internet protocol table, and a state table for remote gateways, and a Public Switched Telephone Network (PSTN) rerouting setting field, said state table for remote gateways being updated periodically by testing links between a local stand-alone gateway and remote stand-alone gateways;
   determining means for determining whether a call service over an Internet is available with reference to the state table for remote gateways by means of the local stand-alone gateway upon receipt of a call service request from a calling private branch exchange (PBX) connected to the local stand-alone gateway via a central office line;
   inserting means for inserting a PSTN central office line access code, set in the PSTN rerouting setting field, in the call service request;
   transmitting means for transmitting the call service request with the PSTN central office line access code to the calling PBX when the call service over the Internet is not available; and
   requesting means in the calling PBX for requesting call service to the PSTN using the PSTN central office line access code.

* * * * *